United States Patent [19]

Stucklen

[11] 3,761,622

[45] Sept. 25, 1973

[54] AMPLITUDE MODULATED TELEMETERING SYSTEM

[75] Inventor: Robert A. Stucklen, Montrose, Colo.

[73] Assignee: The United States of America as represented by the Secretary of the Interior, Washington, D.C.

[22] Filed: Nov. 23, 1970

[21] Appl. No.: 92,116

[52] U.S. Cl. .............. 178/66 R, 179/2 R, 325/38 R
[51] Int. Cl. .............................................. H04l 27/10
[58] Field of Search ................ 340/209, 180, 167 R, 340/169; 174/4; 178/66 R, 67, 68; 179/2 R, 2 DP, 2.5 R, 3; 325/38 R, 26

[56] References Cited

UNITED STATES PATENTS

| | | | |
|---|---|---|---|
| 1,931,038 | 10/1933 | Starr | 178/66 R |
| 3,196,351 | 7/1965 | Slepian | 178/66 R |
| 3,457,510 | 7/1969 | Lender | 178/68 |
| 3,470,468 | 9/1969 | Halpern | 179/15.55 X |
| 3,496,298 | 2/1970 | Crookshanks et al. | 178/68 X |
| 3,524,023 | 8/1970 | Whang | 179/2 DP |
| 3,623,160 | 11/1971 | Giles et al. | 325/163 X |
| 2,640,973 | 6/1953 | Cleaver | 340/209 |
| 3,029,642 | 4/1962 | Burhans | 340/180 |

*Primary Examiner*—Benedict V. Safourek
*Attorney*—Ernest S. Cohen and Albert A. Kashinski

[57] ABSTRACT

Power system phase and frequency are telemetered by amplitude modulating a carrier wave. In the modulating process a sinusoidal input is shaped to a square waveform and filtered through a band-pass filter. The filter output is a high frequency carrier wave ringing at the input frequency. For demodulation, the carrier wave is rectified and filtered through a low-pass filter, resulting in an approximately sinusoidal signal at the input frequency. After conversion to a sawtooth wave, the signal synchronizes an electronic telephone ringer, generating an output signal at station service voltage and frequency.

14 Claims, 6 Drawing Figures

INVENTOR
ROBERT A. STUCKLEN
BY Ernest S. Cohen
Albert C. Vashnoil
ATTORNEYS

INVENTOR
ROBERT A. STUCKLEN
BY Ernest S. Cohen
Albert C. Kashinski
ATTORNEYS

AMPLITUDE MODULATED TELEMETERING SYSTEM

BACKGROUND OF THE INVENTION

In the electrical power industry, a generating station is often controlled by a remote dispatch control center. Effective control at the dispatch center requires accurate telemetering of power system frequency and phase information from the generating station. Monitoring of minute frequency variations in the power system output requires extreme telemetering sensitivity coupled with stability and freedom from noise. To provide these functions, this invention was made.

SUMMARY OF THE INVENTION

This invention is a system for telemetering the frequency and phase of an electrical wave. It is particularly useful for telemetering the characteristics of sinusoidal waves generated by electrical power systems. By employing novel modulation, transmission, and signal recovery techniques, the telemetering system achieves a high degree of accuracy, sensitivity, and stability. Because it produces an output at station service voltage, it is suitable for interface with control systems designed for direct monitoring of power system output.

Generally, the telemetering system includes three independently operating sections - a transmitter, a telephone communications channel, and a receiver. The transmitter converts a low frequency sinusoidal input to an amplitude modulated carrier, ringing at the input frequency. From the transmitter the modulated carrier enters an ordinary telephone communications channel for distribution to the receiver. At the receiver the carrier signal is demodulated, yielding a sinusoidal signal corresponding to the original input.

Modulation of the input signal by the transmitter occurs in two discrete steps. First, the sinusoidal input signal is converted to a representative low voltage square wave of similar frequency. Then the square wave is filtered by a band-pass filter. The filter output is a high frequency carrier wave ringing at the original input frequency. After amplification this carrier wave enters the telephone communications channel.

Arriving at the receiver, the carrier is demodulated by a known diode detection process. Prior to demodulation a band-pass filter similar to the filter in the transmitter recovers the carrier from the communications channel. By rectifying the high frequency carrier, the receiver introduces into the resultant wave a fundamental component with a frequency equal to the original input. A low-pass filter recovers this fundamental component from the rectified wave by blocking the harmonic components and passing only the fundamental.

After demodulation the fundamental signal is converted to a representative sinusoidal output at station service voltage. For this purpose a sawtooth generator converts the low voltage sinusoidal output of the demodulator to a sawtooth wave of corresponding frequency with a steep voltage rise on the leading edge and a subsequent trailing decay. Each leading edge synchronizes a commercial electronic telephone ringer to produce a sinusoidal output wave with the magnitude and frequency of the original input to the transmitter.

Therefore, one object of this invention is a system for modulating a carrier wave.

Another object of this invention is a system for telemetering power system phase and frequency with a resultant signal at station service voltage.

These and other objects of the invention are apparent in the specification and drawing.

DESCRIPTION OF THE PREFERRED EMBODIMENT

General Circuit

Figure 1:
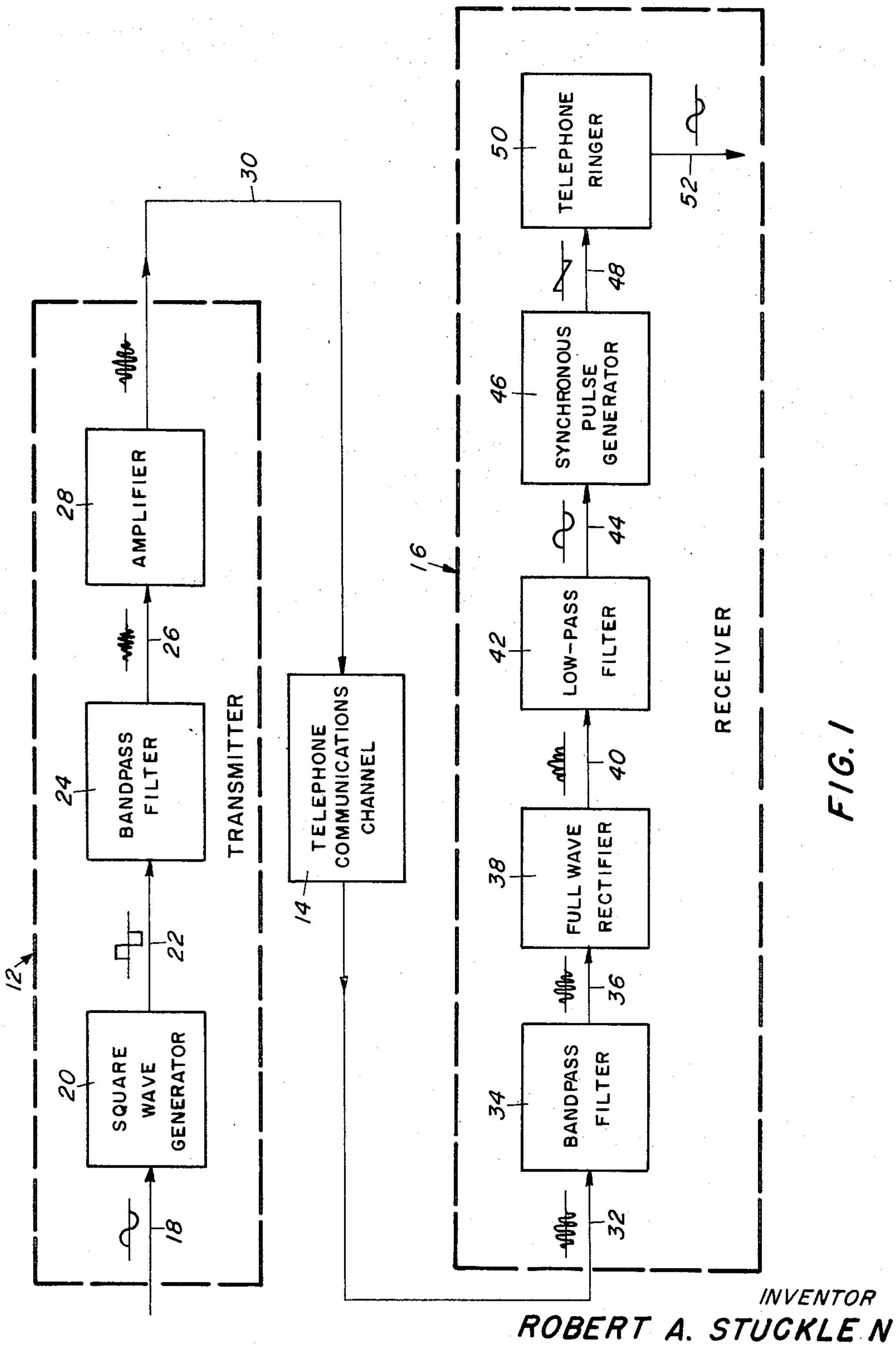
FIG. 1 is a block diagram showing generalized components in a telemetering system.

A telemetering system 10 is shown in FIG. 1. Basically, the telemetering system consists of a transmitter 12, a telephone communications channel 14, and a receiver 16. Within individual components of these sections an electrical input wave is modified as shown by idealized waveforms entering each component. From a power generating system (not shown) a sinusoidal system voltage signal is input through a lead 18 to a square wave generator 20 in the transmitter, generating a low voltage square wave with the same phase and frequency as the input. Fourier analysis shows that this square wave includes numerous sinusoidal components at the fundamental power system and higher harmonic frequencies. Transmitted over a conductor 22 to a band-pass filter 24, the fundamental and selected harmonics are stripped from the square wave leaving a high frequency carrier signal suitable for telephone transmission. Generator 20 and filter 24, through design interaction explained in detail below, modulate this high frequency carrier signal causing periodic amplitude variations, rising and decaying at a rate equal to the square wave frequency — the original power system input frequency.

Leaving the band-pass filter, the modulated signal follows a conductor 26 to an amplifier 28 for distribution over a conductor 30 to an ordinary telephone communications channel 14. By utilizing a carrier frequency within the operating range of ordinary telephone equipment the telemetering system 10 eliminates duplication, and enables the use of readily available communication links of proven reliability.

At the receiver 16 a band-pass filter 34, similar to filter 24, recovers the modulated carrier signal from a conductor 32 and simultaneously eliminates spurious noise resulting from telephone transmission. Next, the refined carrier is rectified, passing from filter 34 through conductor 36, to a full wave rectifier 38. Again, Fourier analysis shows that the rectified wave includes numerous sinusoidal components of both a fundamental frequency and higher harmonics, even though the unrectified carrier included only higher harmonics. Through a conductor 40 the rectified wave passes to a low-pass filter 42 where harmonic components are removed, leaving the fundamental frequency — the same frequency as the original power system input.

For computer operation of a power system most available equipment only accepts input voltages corresponding to power system output. The output of low pass filter 42, however, is of a low voltage suitable for telephone transmission. To achieve computer interface the low voltage output is raised to station service voltage by an electronic telephone ringer 50, similar to those used in commercial telephone systems. A synchronous pulse generator 46 converts the filter 42 output to a sawtooth signal suitable for input to the ringer. After demodulation the approximately sinusoidal output of low-pass filter 42 passes through conductor 44 to the synchronous pulse generator. The generator converts the sinusoidal input to a similar frequency sawtooth wave with a steep voltage rise on the leading edge and a slowly decaying trailing edge. Each steep rise of the wave synchronizes telephone ringer 50 through a conductor 48, generating a sinusoidal station service voltage output from a conductor 52 for use with dispatch control equipment.

In the process of raising the output voltage, several other useful functions are performed by the telephone ringer. One is reshaping of the approximately sinusoidal demodulator output to a more symmetrical sinusoidal corresponding to the original power system output. Another is the circuit stability introduced by the ringer. Built into the telephone ringer, an internal oscillator is synchronized with the sawtooth wave once each cycle. If momentary noise interrupts the transmission system the ringer continues to operate through the internal oscillator. Upon signal return the ringer is resynchronized, maintaining transmission continuity. Because frequency deviations in a power system must average zero over an extended period, the detection stability achieved by this system is extremely desirable.

Theoretical Operation

As an aid to understanding its operation, an analysis of waveforms occurring within telemetering system 10 is helpful. These waveforms, along with others useful for explanation, are shown in FIG. 2 using conventional vertical voltage axes and horizontal time axes.

Figure 2:
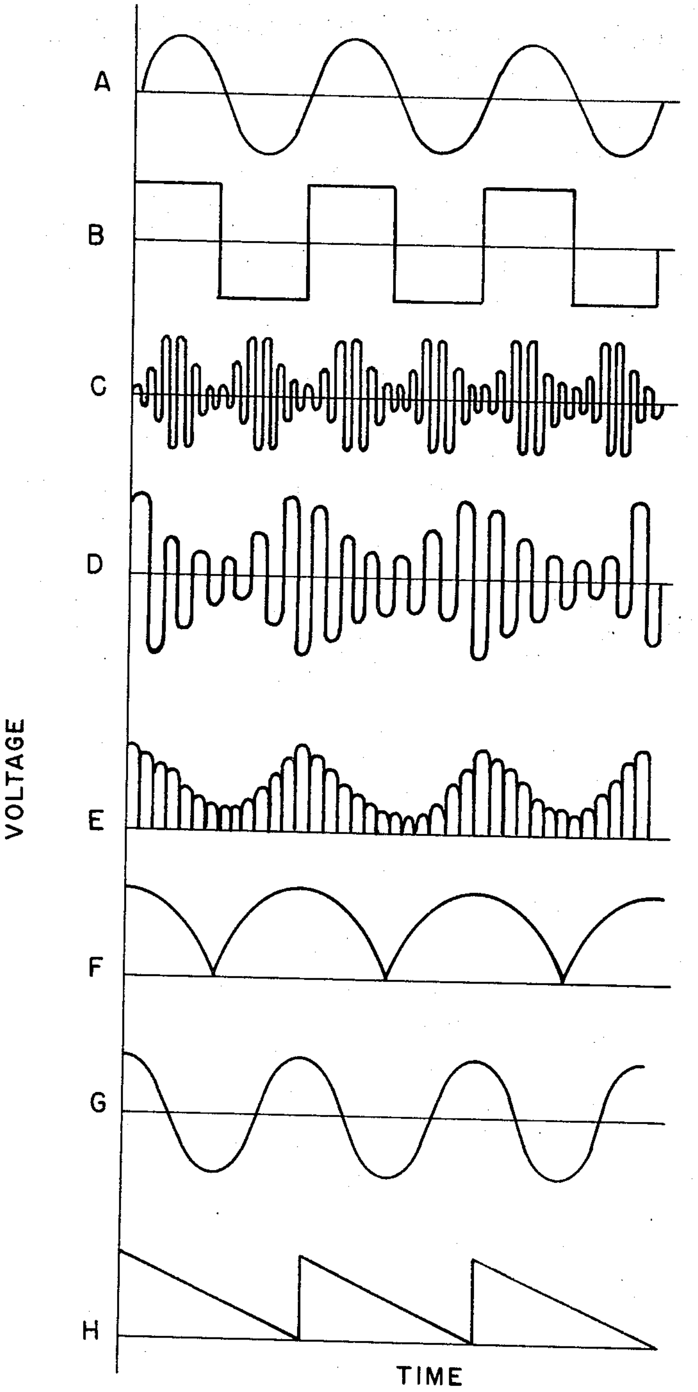
FIG. 2 is a series of waveforms, some representing outputs of the components shown in FIG. 1.

Waveform A in FIG. 2 represents a sinusoidal power system input to the telemetering system 10. Mathematically this wave is expressed as:

1. $v_A = V_A \sin wt$ where $V_A$ is a constant voltage, $w$ is the radian frequency of the wave, and $t$ is the time along the horizontal axis.

As explained above, the transmitter 12 converts sinusoidal input A to a square wave of corresponding phase and frequency, shown as waveform B in FIG. 2. Fourier analysis of a square wave shows that waveform B is expressed mathematically as:

2. $v_B = (4/\pi)\ V_B\ (\sin wt + ⅓ \sin 3\ wt + 1/5 \sin 5\ wt + \ldots .)$

So, generally, the square wave consists of a fundamental component plus odd harmonics of diminishing magnitude. There are no even harmonics.

By passing the square wave through a band-pass filter it is possible to remove the fundamental component and selected harmonics above and below the filter pass band. If the pass band has a width on the order of the fundamental frequency (one-half the frequency spacing between adjacent odd harmonics), only a single harmonic is passed. This wave is expressed as:

3. $v_n = \pi/4\ V_B\ (1/n \sin n\ wt)$, where $n$ is an odd integer. In basic form the wave is similar to waveform A in FIG. 2. If, however, the pass band is on the order of twice the fundamental frequency, the filter passes two adjacent odd harmonics. The resultant wave is expressed as:

4. $v_c + \pi/4\ V_B\ (1/n \sin nwt + 1/n{+}2 \sin(n{+}2)\ wt)$ where $(n)$ is an odd integer, and $(n + 2)$ is the next adjacent odd integer. An ideal form of this wave is shown as waveform C, a high frequency oscillation growing and decaying at a frequency twice the fundamental square wave input.

In appearance waveform C in FIG. 2 is similar to a high frequency, amplitude modulated carrier wave with an envelope oscillating at twice the fundamental frequency. That this waveform in fact results from combining two adjacent odd harmonics is simply shown by phase relationships of the adjacent harmonics. In the period required for one cycle of the fundamental wave, two adjacent odd harmonics, $(n)$ and $(n + 2)$, since they differ by two cycles in that period, pass into phase and out of phase two times. Whey they are in phase they combine, causing a peak; when they are out of phase they substract, causing a valley. The result is shown graphically as waveform C. But while this is the expected result based upon strict mathematical analysis of an ideal square wave, a different result is achieved by this invention, and is shown as waveform D.

Waveform D in FIG. 2 represents the output from a band-pass filter, filtering a square wave generated by the switching circuit of this invention. Rather than growing and decaying twice during the period of a fundamental cycle, as expected for an ideal square wave, waveform D grows and decays only once, ringing with an envelope equal to the fundamental frequency. This is true even though the filter band-width is twice the fundamental frequency, as in the case of waveform C. The following description of this phenomenon is at best an attempt to explain an experimentally derived result.

In general, a square wave is generated by switching a conductor periodically between alternate voltage levels, call them high and low. Using a balanced switching system as input to a high frequency band-pass filter, switching from one stable voltage state to the other, from low to high for example, generates a high frequency, ringing transient with a lower frequency envelope at the filter output. After several diminishing cycles of the envelope the transient response dissipates. For similar circuitry, one cycle of this envelope is similar in shape but longer in period than one envelope cycle of waveform C in FIG. 2. If the circuit is switched back to low again before the end of the first envelope cycle, a second rising and decaying envelope cycle begins, superimposed upon the remainder of the first. If the filter pass band width is close to twice the fundamental switching rate, after transient responses normalize periodic switching of the balanced system at the square wave frequency of waveform B results in an output similar to waveform C. When the unbalanced system of this invention is used a different result occurs.

Using the unbalanced, resistively damped switching system of this invention feeding a filter with a sharp, high frequency pass band approximately twice the width of the fundamental, switching from high to low voltage generates a high frequency ringing transient envelope, similar to the balanced system. Switching from low to high, however, has no effect. Another envelope is generated only by completing a full switching cycle from low to high and back to low again. If the circuit is switched from low to high and then back to low again before the first envelope cycle decays, a second rising and decaying envelope cycle begins, superimposed upon the remainder of the first. After transient responses normalize, the periodic switching of the unbalanced system at the square wave frequency shown in waveform B results in waveform D of FIG. 2. Because an envelope cycle occurs only once in a square wave cycle, the envelope frequency is identical to the square wave frequency. In this way, by choosing a filter 24 with a pass band in the range of harmonic frequencies suitable for telephone transmission, and with a band width approximately twice the fundamental frequency, a high frequency carrier ringing at the power system input frequency is obtained. This amplitude modulated carrier travels from transmitter 12, over the telephone communications channel 14, to receiver 16.

Arriving at receiver 16, the modulated carrier consists of the harmonic frequencies passed by filter 24 and noise added by telephone transmission. A second band-pass filter 34 removes the noise, leaving the pure carrier for demodulation. It is evident from equation (2), above, that the waveform D output from the receiver band-pass filter 34 consists only of high frequency odd harmonics within the pass band of filter 24. At the receiver end of the telemetering system 10, however, the fundamental frequency rather than the harmonics is the desired output. With this objective the modulated carrier is demodulated by the following well known procedure to regain a fundamental frequency component with characteristics analogous to the input wave.

First, the modulated carrier is rectified by a full wave rectifier 38, resulting in waveform E of FIG. 2, lying entirely above the horizontal axis and having alternating peaks and valleys. Visual analysis of waveform E shows that the resultant envelope closely resembles a fully rectified sinusoid, idealized as waveform F. Fourier analysis shows that waveform F is expressed mathematically as:

5. $v = 2/\pi\ V\ (1 + 2/3 \cos wt - 2/15 \cos 2\ wt - 2/35 \cos 3\ wt \ldots\ldots)$, using the same time base as in previous equations. Breaking the idealized envelope into its constituents produces a d.c. component, a fundamental component:

6. $v_G = 4V_i/3\pi \cos wt$, and numerous harmonic components. Comparing waveforms *E* and *F* in FIG. 2, it appears that the fundamental component, cos wt, is present in both waveforms, and that their differences result from interaction of harmonic frequencies. So by rectifying waveform D, the fundamental frequency is introduced into the resultant wave. By removing the harmonic frequencies from the rectified wave with a selective low-pass filter 42, the fundamental frequency is recovered, yielding an approximately sinusoidal signal at the original power system input frequency.

After demodulation, fundamental waveform G is converted to a sawtooth wave of similar frequency, shown ideally as waveform H in FIG. 2. Each leading voltage rise of the low voltage sawtooth wave synchronizes telephone ringer 46, as explained above, producing a high voltage, sinusoidal output similar to input waveform A.

Specific Circuit

Figures 3, 4:
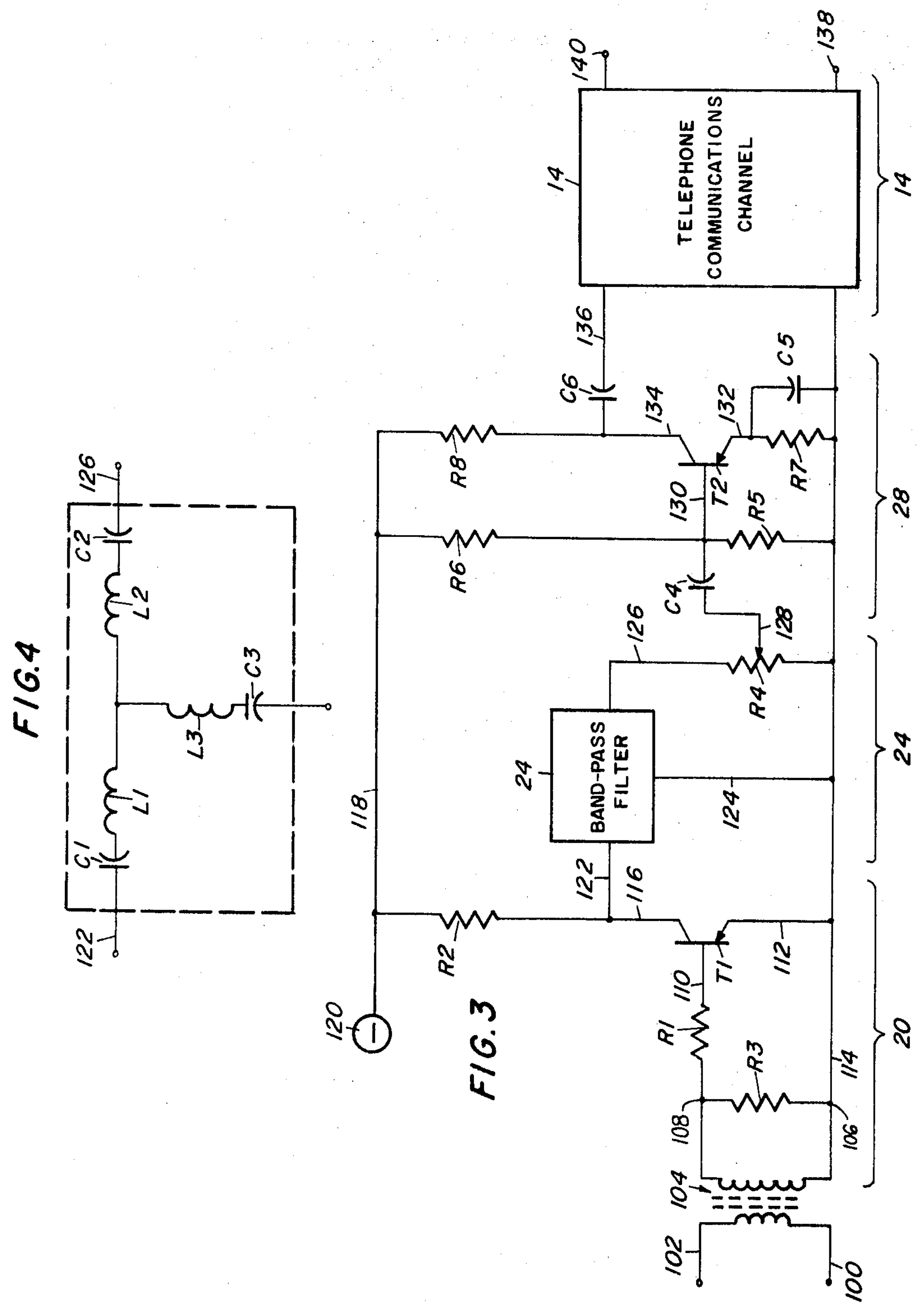
FIG. 3 is a schematic diagram of transmitter and transmission line components shown in FIG. 1.
FIG. 4 is a schematic of a band-pass filter.

Telemetering system 10 is shown by detailed schematics in FIGS. 3–6. Transmitter 12 is shown in FIG. 3 along with telephone transmission line 14. Sinusoidal power system voltage enters the transmitter through the high voltage terminals 100–102 of a step-down transformer 104. A low voltage sinusoidal signal compatible with telephone transmission appears at the transformer output terminals 106–108. The transformer output is applied, through a series resistor $R_1$, to the base 110 of a PNP transistor $T_1$, operating in the common emitter mode. In this configuration the emitter 112 of transistor $T_1$ is in series with a common ground conductor 114 and output terminal 106 of transformer 104, while the collector 116 is in series with an impedance load resistor $R_2$, a negative potential conductor 118, and a source of negative potential 120. In response to the sinusoidal voltage input, transistor $T_1$ switches on and off, causing periodic current flow through the load $R_2$ with a square waveform at the input frequency. When transistor $T_1$ is turned off, a resistor $R_3$ across transformer output terminals 106–108 provides a current path for the transformer output.

Between collector 116 and load resistor $R_2$ in the receiver circuit of FIG. 3, a conductor 122 applies the output of transistor $T_1$ to a band-pass filter 24. A suitable band-pass filter configuration is shown in FIG. 4, arranged in a T-section with a capacitor $C_1$–$C_3$ and an inductor $L_1$–$L_3$ in series on each arm of the T. With suitable values of capacitance and inductance, the filter passes a range of frequencies suitable for telephone transmission, over a band-width approximately twice the input frequency. A conductor 124 grounds one arm of the filter to common conductor 114 while the other arm 126 passes to ground through a potentiometer load resistance $R_4$.

As explained in the theoretical section above, with this circuit configuration an amplitude modulated carrier similar to waveform D of FIG. 2 is generated across potentiometer $R_4$ when transistor $T_1$ switches on and off in response to the sinusoidal power system input. When transistor $T_1$ switches on, an effective short circuit occurs between the emitter 112 and collector 116, causing a rapid voltage rise across the high impedance load resistor $R_2$. The voltage at conductor 122 also rises rapidly, applying an input signal to filter 24 and generating, across potentiometer $R_4$, an output voltage with a frequency lying in the filter pass band.

When transistor $T_1$ switches off it open circuits, leaving only filter 24 as a circuit path for dissipation of the voltage across $R_2$. As shown in FIG. 4, the filter circuit includes both series inductors and capacitors, so the voltage across $R_2$, originally rising rapidly through a short circuit, dissipates more slowly through these frequency responsive elements. By choosing a high enough impedance value for $R_2$, it appears that the rate of voltage dissipation when the transistor switches off is sufficiently slow to avoid high frequency components within the pass band of filter 24. As a result of the above interaction, when transistor $T_1$ switchess off, only frequency components outside the pass band of filter 24 are generated, so no voltage output appears across potentiometer $R_4$. When the transistor switches back on, however, an output signal is again generated. By switching $T_1$ back on before the first envelope cycle of the signal dissipates, overlapping signals are generated, forming a continuous wave with an envelope rising and decaying at the input frequency.

Adjusted to an appropriate level by the pick-off 128 of potentiomenter $R_4$, the amplitude modulated carrier is applied through a d.c. isolation capacitor $C_4$ to the base 130 of a PNP transistor $T_2$. Biased by a resistor $R_5$ in series between the base 130 and negative conductor 118 and by a resistor $R_7$ between common ground conductor 114 and the emitter 132, transistor $T_2$ amplifies the filter output. A resistor $R_8$ between the collector 134 and negative conductor 118 loads the transistor, while a capacitor $C_5$ in parallel with biasing resistor $R_7$ provides an a.c. by-pass around the resistor. From the emitter of transistor $T_2$ the amplified signal passes through a d.c. blocking capacitor $C_6$ to one input 136 of telephone communications channel 14. The other communication channel input is grounded by common conductor 114. At the telephone communications channel output terminals 138 and 140 the signal is applied to receiver 16.

Figure 5:
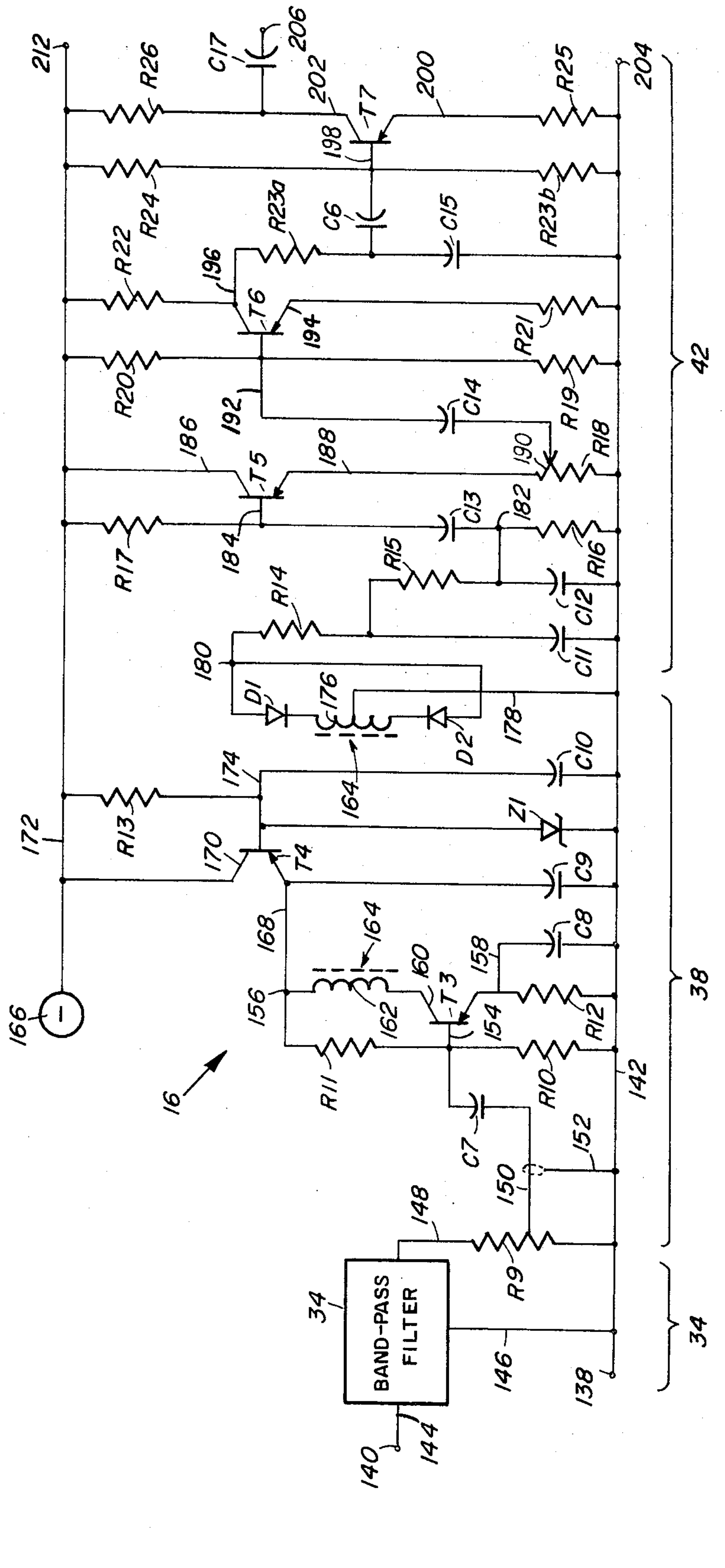
FIGS. 5 and 6 are schematics of receiver components shown in FIG. 1.

Input connections to receiver 16 from the telephone communications channel 14 are shown in FIG. 5 as terminals 138 and 140. Terminal 138 is grounded by a common conductor 142. At the other terminal 140, through a filter input arm 144, the input signal enters a band-pass filter 34, similar in design to filter 24. A second arm 146 of filter 34 is grounded by common conductor 142, while the third arm 148 passes to ground in series with a potentiometer resistor $R_9$. After removal from the communications channel by filter 34, the modulated carrier signal appears across $R_9$. A potentiometer pickoff 150 with a grounded shield 152 applies this signal, through a series d.c. isolation capacitor $C_7$, to the base 154 of a PNP transistor $T_3$.

For linear amplification of the input signal, transistor $T_3$ is biased by a resistor $R_{10}$ between common conductor 142 and base 154, a resistor $R_{11}$ between the base and the negative potential terminal 156 of the transistor load, and a resistor $R_{12}$ between common conductor 142 and the emitter 158. A capacitor $C_8$ provides an a.c. current path in parallel with biasing resistor $R_{12}$. The load of transistor $T_3$ between the collector 160 and negative potential terminal 156 is the primary winding 162 of an interstage transformer 164.

Driving voltage for signal amplification by transistor $T_3$ is obtained from a negative potential source 166, connected to terminal 156 through a common negative conductor 172, and through the emitter 168 and collector 170 of a power supply regulation transistor $T_4$. A constant voltage Zener diode $Z_1$ across the base 174 of transistor $T_4$ and ground conductor 142, in combination with a resistor $R_{13}$, across the base and negative conductor 172, bias transistor $T_4$ to hold the voltage of terminl 156 constant, isolating amplifier $T_3$ from feedback regardless of voltage fluctuations in the negative potential source. A capacitor $C_9$ in series between the emitter 168 and common conductor 142 filters input ripple. A capacitor $C_{10}$ in series between the base 174 and common conductor 142 filters output ripple.

Across primary winding 162 of interstage transformer 164, an amplified signal corresponding to the receiver input appears. By magnetic coupling a similar signal appears across the electrically isolated secondary winding 176 of the transformer, center-tapped to common conductor 142 by a center-tap 178. The transformer is wound with a 1:2 ratio, so a voltage equal to the primary voltage appears across each half of the centertapped secondary winding. Diodes $D_1$ and $D_2$ between the opposite ends of secondary windng 176 and a common terminal 180 rectify the transformer output, producing a resultant waveform similar to the rectified carrier E in FIG. 2.

After rectification, a low-pass filter consisting of series resistor $R_{14}$ and capacitor $C_{11}$ between terminal 180 and ground conductor 142 removes harmonic components from the resultant signal. A second series resistor $R_{15}$ and capacitor $C_{12}$, between $R_{14}$ and $C_{11}$, further eliminate harmonic components. At a terminal 182 between resistor $R_{15}$ and capacitor $C_{12}$ there appears a periodic signal with a d.c. component and an approximately sinusoidal component similar to waveform G in FIG. 2.

Leaving low-pass filter section 42, the sinusoidal component is applied through a capacitor $C_{13}$ to the base 184 of a PNP transistor $T_5$, operating in the emitter follower mode. A resistor $R_{16}$ between terminal 182 and common conductor 142 provides a path for the d.c. component in the signal, while capacitor $C_{13}$ provides d.c. isolation for transistor $T_5$. A resistor $R_{17}$ between common negative conductor 172 and the base 184 biases transistor $T_5$ to operating potential. WIth the collector joined to negative conductor 172 and the emitter 188 in series with a grounded potentiometer resistor $R_{18}$, an approximately sinusoidal signal at power system frequency appears across $R_{18}$. The characteristics of this signal are analogous to the original input from the power system.

After removal by a pick-off 190 of potentiometer $R_{18}$, the sinusoidal signal enters two further amplification stages in the low pass filter section 42. From pick-off 190, through a d.c. isolation capacitor $C_{14}$, the signal is applied to the base 192 of a PNP transistor $T_6$. Biased by a resistor $R_{19}$ between base 192 and common conductor 142, by a resistor $R_{20}$ between base 192 and negative conductor 142, and by a resistor $R_{21}$ between the emitter 194 and common conductor 142, transistor $T_6$ produces an amplified output across load resistor $R_{22}$ between the collector 196 and common negative conductor 172. From the collector 196 this amplified output is filtered by a third low-pass filter section consisting of a series resistor $R_{23A}$ and a capacitor $C_{15}$.

A d.c. isolation capacitor $C_{16}$ applies the filtered output of transistor $T_6$ to the base 198 of a PNP transistor $T_7$ in the final amplification stage of the filter section. Common-to-base resistor $R_{23B}$, base-to-negative resistor $R_{24}$, and emitter 200-to-common resistor $R_{25}$ bias transistor $T_7$ to produce a sinusoidal output across a load resistor $R_{26}$ between the collector 202 and negative conductor 172. With the d.c. component from collector 202 blocked by a capacitor $C_{17}$, sinusoidal output similar to waveform G in FIG. 2 appears across the output terminals 204 and 206 of the low-pass filter section.

Figure 6:
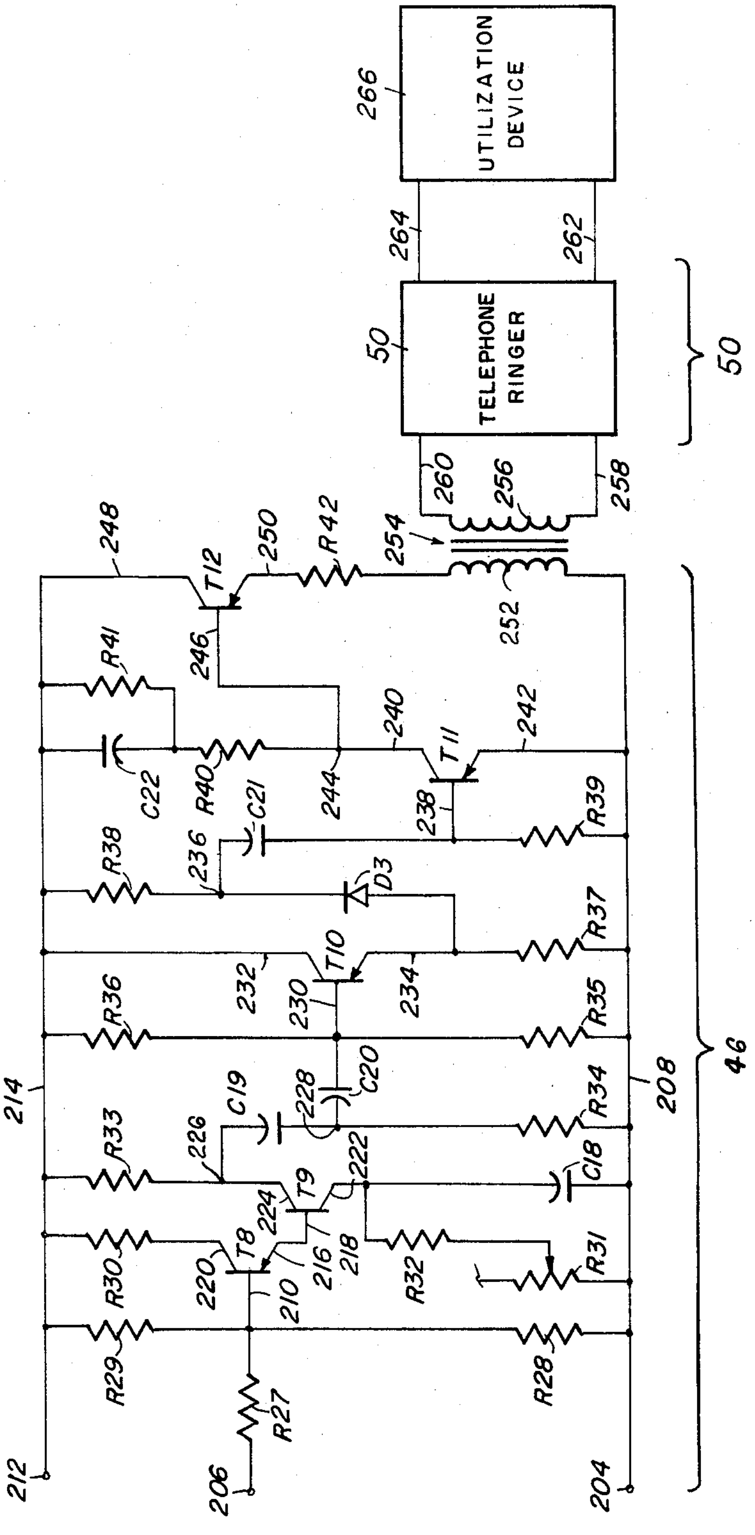

From the low-pass filter section 42 the sinusoidal output enters synchronous pulse generator 46, as shown in FIG. 6. A resistor $R_{27}$ limits input loading so that the signal, at an input terminal 206, is available for driving other functions (not shown). One terminal 212 connects a common negative potential conductor 214 through conductor 172 to the source of negative potential 166, shown in FIG. 5. At two input terminals 204 and 206 the signal is applied across a common ground conductor 208 and, through resistor $R_{27}$, the base 210 of a PNP transistor $T_8$.

Two resistors $R_{28}$ and $R_{29}$ between ground conductor 208 and base 210, and between base 210 and negative conductor 214, respectively, bias transistor $T_8$ and another PNP transistor $T_9$ for geneating a square wave at the input frequency. The emitter 216 of transistor $T_8$ is in series with the base 218 of transistor $T_9$. A resistor $R_{30}$ between the collector 220 of $T_8$ and common conductor 214 loads the transistor for operation as a current amplifier. For controlling the switching voltage level of $T_8$ and $T_9$ a variable resistor $R_{31}$ and a fixed resistor $R_{32}$ are connected in series between ground conductor 208 and the emitter 220 of transistor $T_9$. Through an a.c. current path provided by a capacitor $C_{18}$ in parallel with series resistors $R_{31}$ and $R_{32}$, the collector 224 of transistor $T_9$ feeds a load resistor $R_{33}$ in series with common negative conductor 214. At a terminal 226 between collector 224 and resistor $R_{33}$, a square wave of the sinusoidal input frequency appears.

Next, the square wave output is converted to a sawtooth wave for synchronizing telephone ringer 50. The output of transistor $T_9$ is differentiated by a capacitor $C_{19}$ in series with a resistor $R_{34}$ between terminal 226 and ground conductor 208. The differentiated output across resistor $R_{34}$ is a sharply rising and falling impulse generated during the leading edge of the square wave, and a sharply falling and rising impulse on the trailing edge. For impedance gain the output signal is applied from a terminal 228 between capacitor $C_{19}$ and resistor $R_{34}$, through a d.c. isolation capacitor $C_{20}$ to the base 230 of a PNP transistor $T_{10}$. Transistor $T_{10}$ operates in the emitter follower mode with collector 232 in series with common negative conductor 214. Resistors $R_{35}$ and $R_{36}$ between ground 208 and base 230, and between base 230 and negative conductor 214, respectively, bias transistor $T_{10}$ to generate an output similar to the signal across resistor $R_{34}$. This output appears across a resistor $R_{37}$ between the emitter 234 of transistor $T_{10}$ and ground.

From the emitter of transistor $T_{10}$ a diode $D_3$ in series with a resistor $R_{38}$ and common negative conductor 214 passes only sharply rising and falling impulses at the original input frequency. These impulses appear across resistor $R_{38}$. From a terminal 236 between diode $D_3$ and resistor $R_{38}$ the impulses are applied through a capacitor $C_{21}$ to the base 238 of a PNP transistor $T_{11}$. In series with ground conductor 208, capacitor $C_{21}$ and a high impedance resistor $R_{39}$ differentiate the output across resistor $R_{38}$ so that the signal appearing at the base 238 of transistor $T_{11}$ contains a negative impulse. With d.c. isolation provided by $C_{21}$, the high impedance resistor $R_{39}$ holds $T_{11}$ off until switched on during the negative impulse. Since the positive impulse drives the base 238 of transistor $T_{11}$ positive with respect to the emitter 242, the impulse does not appear at the collector 240 output. With emitter 242 in series with ground conductor 208, a negative impulse at the base 238 turns on transistor $T_{11}$, quickly charging a capacitator $C_{22}$ through a resistor $R_{40}$ in series between collector 240, capacitator $C_{22}$, and negative conductor 214. When transistor $T_{11}$ switches off, resistor $R_{40}$ limits the collector current, and capacitor $C_{22}$ slowly discharges through a parallel resistor $R_{41}$. The resulting signal across capacitor $C_{22}$ is a steeply rising, slowly decaying waveform at the power system input frequency, resembling sawtooth waveform H in FIG. 2.

From a terminal 244 between base 240 and resistor $R_{40}$ the resultant sawtooth signal is applied to the base 246 of transistor $T_{12}$, and then to telephone ringer 50. Used in the emitter follower mode with the collector 248 in series with negative conductor 214, transistor $T_{12}$ provides impedance gain. To the emitter 250 of transistor $T_{12}$, a resistor $R_{42}$ and the primary coil 252 of an interstage transformer 254 are connected in series with ground conductor 208. Resistor $R_{42}$ limits the emitter current and provides a high input impedance. Transformer 254 isolates the synchronous pulse generator 46 from the telephone ringer 50, input to the ringer feeding from the secondary transformer coil 256 through conductors 258 and 260. From the telephone ringer, operating as explained above, a sinusoidal output signal at power system frequency passes through conductors 262–264 to a utilization device 266 for dispatch control.

Phase angle comparison of two generating systems is possible through use of two telemetering systems 10. Although the phase angle of the telephone ringer output may differ from the power system input, two identical telemetering systems produce similar phase shifts, so that the relative phase angles of the inputs and outputs are matched. For phase angle display, two telemetering systems are used to drive a synchroscope from the output at terminals 204 and 206.

In one embodiment of this telemetering system the following circuit elements were used effectively:

| | | |
|---|---|---|
| Resistors (R) in K: | | Capacitors (C) in $\mu$f: |
| $R_1$ — 0.10 | $R_{22}$ — 5 | $C_1$ — ) see band-pass |
| $R_2$ — 20 | $R_{23}$B — 47 | $C_2$ — ) filter |
| $R_3$ — 10 | $R_{24}$ — 430 | $C_3$ — ) specifications |
| $R_4$ — 2.5 | $R_{25}$ — 1 | $C_4$ — 0.10 |
| $R_5$ — 40 | $R_{26}$ — 6 | $C_5$ — 10.0 |
| $R_6$ — 100 | $R_{27}$ — 15 | $C_6$ — 0.10 |
| $R_7$ — 0.10 | $R_{28}$ — 10 | $C_7$ — 0.22 |
| $R_8$ — 0.60 | $R_{29}$ — 200 | $C_8$ — 0.10 |
| $R_9$ — 2.5 | $R_{30}$ — 15 | $C_9$ — 40.0 |
| $R_{10}$ — 1 | $R_{31}$ — 2.5 | $C_{10}$ — 10.0 |
| $R_{11}$ — 15 | $R_{32}$ — 0.10 | $C_{11}$ — 0.10 |
| $R_{12}$ — 0.10 | $R_{33}$ — 10 | $C_{12}$ — 0.10 |
| $R_{13}$ — 10 | $R_{34}$ — 100 | $C_{13}$ — 0.10 |
| $R_{14}$ — 10 | $R_{35}$ — 750 | $C_{14}$ — 0.22 |
| $R_{15}$ — 10 | $R_{36}$ — 1K | $C_{15}$ — 0.22 |
| $R_{16}$ — 15 | $R_{37}$ — 10 | $C_{16}$ — 0.22 |
| $R_{17}$ — 1K | $R_{38}$ — 10 | $C_{17}$ — 10.0 |
| $R_{18}$ — 10 | $R_{39}$ — 100 | $C_{18}$ — 40.0 |
| $R_{19}$ — 10 | $R_{40}$ — 0.10 | $C_{19}$ — 0.033 |
| $R_{20}$ — 100 | $R_{41}$ — 100 | $C_{20}$ — 0.033 |
| $R_{21}$ — 0.60 | $R_{42}$ — 5 | $C_{21}$ — 0.10 |
| | $R_{23}$ A — 5 | $C_{22}$ — 0.10 |
| Transistors (T) | | Diodes (D)(Z) |
| $T_1$ to $T_{12}$ — 2N1377 | | $D_1$ — 1N34A |
| | | $D_2$ — 1N34A |
| | | $D_3$ — 1N645A |
| | | $Z_1$ — 1N758 |
| Inductors (L) | | Band-Pass Filter Specifications |
| $L_1$ ) See band-pass | | Input source — 600 ohms |
| $L_2$ ) filter | | Output load — 600 ohms |
| $L_3$ ) specifications | | Total pass band — 120 Hz |
| | | Center frequency — 2.5 KHz |
| Telephone Ringer | | |
| Model ICRR-15 | | |
| Manufactured by the Warren Manufacturing Co., Littletown, Mass. | | |

While the invention is described as a specific preferred embodiment with specific circuit parameters given in addition, equivalent designs and elements are expected. As an example, while the above band-pass filter specifications are optimum, lesser tolerances function effectively. Other circuitry modified for particular purposes is equally effective. For this reason the scope of the invention is limited only by the following claims.

I claim:

1. A method for telemetering an electrical signal comprising:

converting an input wave to a representative wave containing a band of multiple odd harmonics of the input wave without intermediate even harmonics, filtering the representative wave through a band-pass filter having sufficient band width to pass more than one of the odd harmonics for forming an amplitude modulated carrier wave, transmitting the modulated carrier wave to a receiver, and demodulating the carrier wave to produce a resultant wave with characteristics analogous to the input wave.

2. A method for telemetering an electrical signal, as claimed in claim 1, in which the step of converting further comprises:

converting a sinusoidal input wave to a representative square wave containing a band of multiple odd harmonics of the input wave without intermediate even harmonics.

3. A method for telemetering an electrical signal, as claimed in claim 1, in which the step of filtering further comprises filtering the representative wave through a band-pass filter with a band width on the order of twice the frequency of the input wave.

4. A method for telemetering an electrical signal, as claimed in claim 2, in which the step of filtering further comprises filtering the representative wave through a band-pass filter with a band width on the order of twice the frequency of the input wave.

5. A method for telemetering an electrical signal as claimed in claim 1 including the further steps of:

converting the resultant wave to a sawtooth wave, and applying the sawtooth wave to synchronize an electronic telephone ringer for producing an output corresponding to the input wave.

6. A method for telemetering an electrical signal as claimed in claim 4 including the further steps of:

converting the resultant wave to a sawtooth wave, and applying the sawtooth wave to synchronize an electronic telephone ringer for producing an output similar to the input wave.

7. An apparatus for telemetering an electrical signal comprising:

means for converting an input wave to a representative wave containing a band of multiple odd harmonics of the input wave without intermediate even harmonics, a band-pass filter having a band width sufficient to pass more than one of said odd harmonics of the representative wave for filtering the representative wave to pass an amplitude modulated carrier wave, a transmitter for transmitting the carrier wave to a receiver, a receiver, and means in the receiver for demodulating the carrier wave and producing a resultant wave with characteristics analogous to the input wave.

8. An apparatus for telemetering an electrical signal as claimed in claim 7 in which:

the input wave is a sinusoid, and the means for converting is a square wave generator.

9. An apparatus for telemetering an electrical signal as claimed in claim 8 in which:

the square wave generator includes a transistor switching into a high impedance load resistor, and the representative wave is applied to the band pass filter from a point between the transistor and the load resistor.

10. An apparatus for telemetering an electrical signal as claimed in claim 7 in which the filter band width is on the order of twice the frequency of the input wave.

11. An apparatus for telemetering an electrical signal as claimed in claim 8 in which the filter band width is on the order of twice the frequency of the input wave.

12. An apparatus for telemetering an electrical signal as claimed in claim 9 in which the filter band width is on the order of twice the frequency of the input wave.

13. An apparatus for telemetering an electrical signal as claimed in claim 7, further comprising:

means for converting the resultant wave to a sawtooth wave, and an electronic telephone ringer for receiving the sawtooth wave and producing an output corresponding to the input wave.

14. An apparatus for telemetering an electrical signal as claimed in claim 12, further comprising:

means for converting the resultant wave to a sawtooth wave, and an electronic telephone ringer for receiving the sawtooth wave and producing an output corresponding to the input wave.

* * * * *